United States Patent

[15] 3,659,483

Matthews [45] May 2, 1972

[54] JACKET STRIPPING TOOL

[72] Inventor: James J. Matthews, c/o Utility Tool Corp., P.O. Drawer B, Town Street (Rt. 82), East Haddam, Conn.

[22] Filed: May 25, 1970

[21] Appl. No.: 40,039

[30] Foreign Application Priority Data

Jan. 15, 1970 Great Britain..........................2,081/70

[52] U.S. Cl. ..............................................81/9.5 C, 20/90.1
[51] Int. Cl. .........................................................H02g 1/12
[58] Field of Search ...........................81/9.5 R, 9.5 C, 9.51; 30/90.1; 83/924; 145/3.5, 3.6, 3.61

[56] References Cited

UNITED STATES PATENTS 2,346,314  4/1944  Lembitz..............................30/90.1 X
3,361,015  1/1968  Matthews..............................81/9.5 C

FOREIGN PATENTS OR APPLICATIONS 768,853  2/1957  Great Britain..........................81/9.5 C Primary Examiner—Andrew R. Juhasz
Assistant Examiner—Michael Koczo, Jr.
Attorney—Bauer & Amer

[57] ABSTRACT

A cable jacket stripping tool including a cutting member having a cutting edge and lifting ramp so arranged that, during a cutting interval, the cutting edge functions in a clearance position from the cable core to initiate cutting removal of the major portion of the jacket surrounding the core and the lifting ramp completes this removal by causing rupture of the remaining uncut jacket portion. Thus, complete jacket removal is achieved with a cutting edge sufficiently spaced from the cable core to obviate inadvertent nicking thereof.

4 Claims, 8 Drawing Figures

PATENTED MAY 2 1972
3,659,483
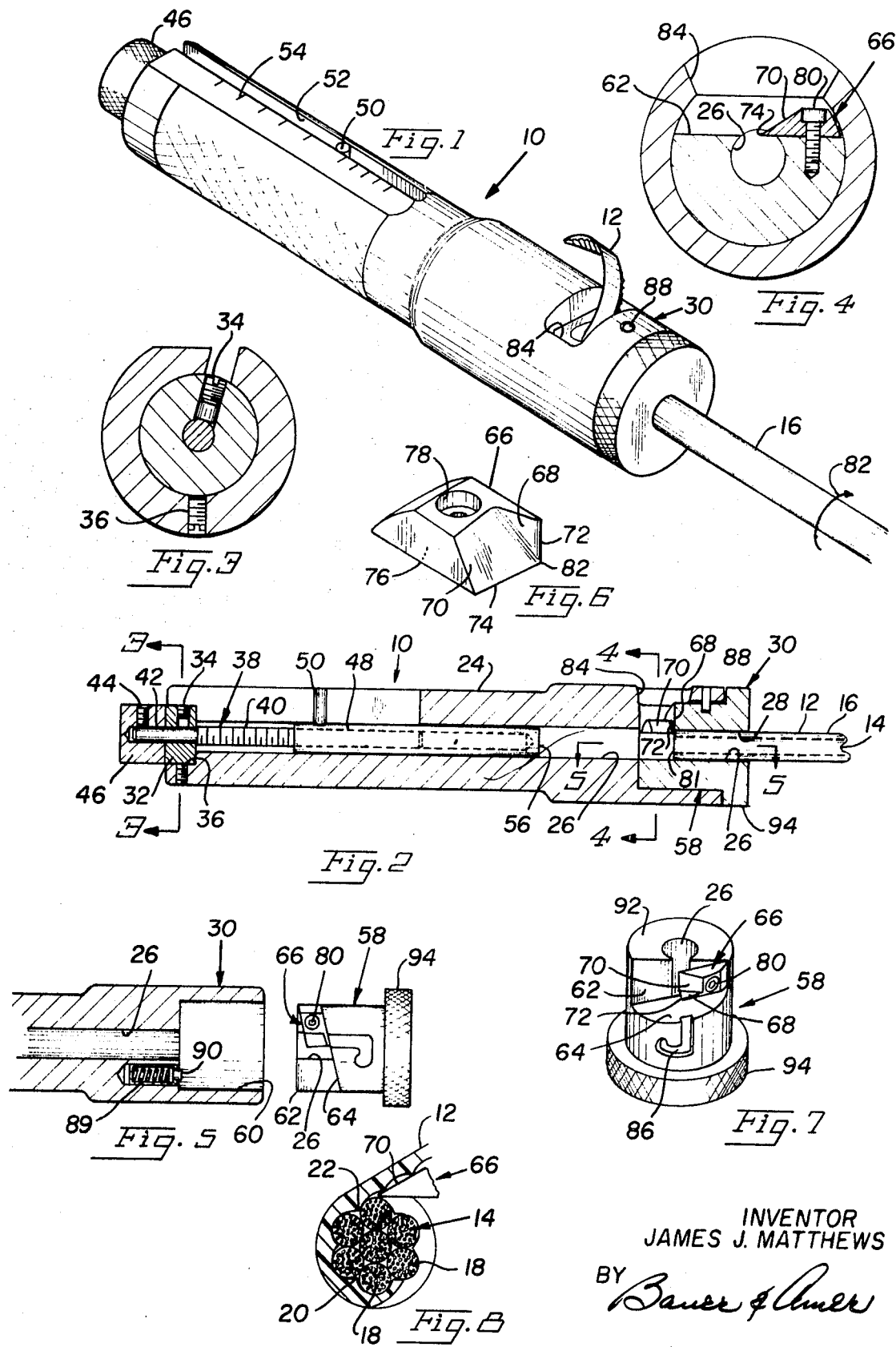
INVENTOR
JAMES J. MATTHEWS
BY Bauer & Amer
ATTORNEYS

JACKET STRIPPING TOOL

TOOL

The present invention generally relates to stripping of cable jackets, and more particularly to an improved tool for cleanly and effectively removing an insulation or other type jacket from about a core without endangering the core to cutting or nicking.

There are numerous models and types of tools available for stripping the outer insulation or jacket from about a metal cable core in order to properly prepare the cable for electrical connection or some other such purpose. The stripping operation unavoidably entails the use of a cutting edge which during cutting of the insulation must be prevented from nicking or cutting the metal core. With known stripping tools, it is a practice to leave a safety factor thickness of insulation after the main stripping operation which is subsequently carefully removed without damaging the core or, at the other extreme, it is the practice to try to position the cutting edge with such accuracy, by complex micrometer and other such mechanisms, that stripping can be achieved in a single cutting pass along the cable and still not damage the core. None of these techniques, as well as variations thereof, are entirely satisfactory since the former entails prohibitive handling expense and the latter necessitates an expensive and complex tool construction.

Broadly, it is an object of the present invention to provide an improved cable jacket stripping tool overcoming the foregoing and other shortcomings of the prior art. Specifically, it is an object to provide an insulation stripping tool in the first cutting operation of which the entire thickness of insulation is cleanly and effectively removed from about the cable core and yet the cable core is never in danger of being nicked or cut by the cutting edge of the tool.

A cable stripping tool demonstrating objects and advantages of the present invention includes a radially oriented cutting edge operatively arranged to initiate cutting action into the insulation with a radial cut in a first encountered cable end which is only two-thirds the insulation thickness, and thus a safe one-third of the thickness removed from the cable core. However, cooperating with the cutting edge is an insulation lifting element effective to apply a radially outward force on the insulation and which initially is effective to rupture the uncut one-third insulation thickness and thereafter to lift the insulation from about the metal core into cutting relation with the cutting edge occupying a clearance position from the metal core.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a perspective view of an insulation-stripping tool according to the present invention;

FIG. 2 is a side elevational view, in longitudinal section, of the tool illustrating internal structural features;

FIG. 3 is a front elevational view of the tool, in section taken on line 3—3 of FIG. 2, illustrating features of the length-adjusting mechanism thereof;

FIG. 4 is an end elevational view, on a greatly enlarged scale and in section taken on line 4—4 of FIG. 2, illustrating the operative position of the member producing insulation or jacket stripping of the cable which is introduced into the tool hereof.

FIG. 5 is a partial front elevational view, in section taken on line 5—5 of FIG. 2 but omitting the cable, illustrating further structural details of the stripping end of the tool;

FIG. 6 is an enlarged scale perspective view of the member of the cutting tool presenting a cutting edge and an insulation or jacket-lifting ramp or shape;

FIG. 7 is a front elevational view illustrating the operative position of the cutting and stripping member of FIG. 6; and FIG. 8 is an end elevational view illustrating the insulation or jacket-lifting function of the lifting ramp of the FIG. 6 member.

Reference is now made to the drawings wherein there is shown a cable insulation-stripping tool, generally designated 10, demonstrating objects and advantages of the present invention. There is often a need to strip the outer insulation or jacket 12 from about a metal cable core 14 in order to properly prepare the cable 16 for electrical connection or some other such purpose. A contemplated end use of the tool or device 10 is to achieve this stripping which, of necessity, entails the use of a cutting edge, but without permitting the cutting edge to cause nicking or cutting of the metal core 14. Further, as best illustrated in FIG. 8, the metal core 14 consists of individual strands 18 arranged in adjacent position with substantially triangular clearances or voids 20 occuring between adjacent strands. In the molding of the jacket 12 about the core 14, a corresponding triangular shape 22 on the inner surface of the jacket 12, of necessity, projects into each of the voids 20. Thus, the jacket 12, including the inwardly projecting shapes 22, must be removed from about the core 14 without cutting or nicking the core.

The device 10 includes an elongated, generally cylindrical body 24 having a cable-receiving opening 26 along its central longitudinal axis. Longitudinal opening 26, more particularly, has a main opening 28 at the somewhat larger diameter end 30 of the device which, in practice, is the end in which that end of the cable which is to be stripped of its insulation or jacket 12 is projected incident to stripping operation of the device 10. The stripping end 30 of the device 10 will subsequently be described in detail.

At its opposite end, the device 10 includes means for regulating the extent of the cable that is to be stripped of its insulating jacket 12. Specifically, this length-regulating means includes a plug 32 mounted with a set screw 34 in a stationary position in an end counterbore 36. Rotatably projected through the plug 32 is a shaft 38 having a threaded section 40 in advance of the plug 32 and a smooth section 42 projected therebeyond on which is mounted, by a set screw 44, a hand grip 46 rotating the shaft 38 and, more particularly, the threaded section 40 thereof. In threaded engagement with the threaded section 40 is a sleeve 48 having a laterally extending pin or pointer 50 which rides in a longitudinal groove 52, as clearly illustrated in FIG. 1, along the length of which there are indicia 54 effective to indicate the length of the end of the cable which will be stripped. That is, indicia 54 measures the length of the cable end which is projected through the main opening 28 that will ultimately abut against the stop or rearward end 56 of the sleeve 48. Thus, threaded section 40 functions somewhat like a worm gear in that rotation thereof produces sliding movement in the sleeve 48 and, in turn, permits locating the stop surface 56 at any selected depth from the main opening 28.

Returning now specifically to the stripping function of the device 10, and thus the operation of the stripping end 30 thereof, this end, as clearly illustrated in FIG. 5 in conjunction with the other figures, includes a plug 58 insertable in a counterbore 60 of the stripping end 30 of the device. As clearly illustrated in FIG. 2, in the seated position of the plug 58 within the counterbore 60, there is a continuation or alignment of the different lengths of the central bore 26. The distal or inwardly projected end of the plug 58, as is perhaps best illustrated in FIG. 7, has a notch machined therein bounded by two transversely oriented walls 62 and 64, wall 62 being oriented tangentially of the opening 26 and wall 64 radially thereof. It is significant to note that wall 64 is angularly oriented or inclined in a direction towards the main opening 28 and also that its depth is such that it intersects, as a chord, the opening 26. More particularly, and as best illustrated in FIG. 4, the wall 62 which extends laterally of the base of the wall 64 occupies the relationship of a chord relative to the opening 26. The significance of the angular orientation of the wall 64 and of the location of the support surface 62 in a position intersecting the opening 26 will soon be apparent.

The cutting and stripping member of the device 10 is illustrated in isolated perspective in FIG. 6 and designated 66 therein. Machined in the front face of the member 66 is a notch bounded by a vertically oriented wall 68 and a transverse wall 70 which additionally is angled at approximately 45 degrees to the horizontal. At the extreme forward end of the vertical wall 68 there is provided a cutting edge 72 which is effective in cutting a spiral path along and into the insulating jacket 12. The inclined surface 70 also terminates in a lifting or rupturing edge 74 that serves as a leading edge for the wedge or substantially triangular shape which is defined by the wall 70 and the bottom horizontal wall 76 of the member 66, this wedge shape, as will be described in greater detail subsequently, effectively serving as a lifting ramp which contributes to effective stripping of the insulating jacket 12. Completing the construction of the member 66 is a mounting opening 78 which, in practice, accommodates a mounting screw 80 which secures the member 66 in a mounted position on the plug 58. This mounted position consists of the member 66 being supported on the support wall 62 and seated firmly against the angularly oriented radial wall 64, such mounted position being clearly illustrated in FIGS. 4, 7 and 8.

As perhaps may best be appreciated from FIG. 2, use of the stripping device 10 hereof contemplates the initial insertion of the cable 16 through the main opening 28 into the axial bore 26 for an initial depth determined by the abutment of the cable front end 81 against the cutting edge 72 which, along with the lifting ramp 70, occupies an obstructing position projected into the opening 26. With the cable end 81 firmly against the cutting edge 72 of the vertical wall 68, the user of the device 10 is required to rotate the cable 16 and the device 10 relative to each other in a clockwise direction 82 thereby causing a spiral cutting action at the cutting edge 72 with respect to the jacket 12. More particularly, cutting edge 72 causes a radial cut into that portion of the insulating jacket 12 which abuts against this cutting edge at the cable end 81. As is perhaps best illustrated in FIG. 2, the depth of this radial cut, of necessity, terminates at the lowermost point 83 of the cutting edge 72 (see FIG. 6). This depth will be understood to occur at a point within the thickness of the jacket 12 or, in other words, it occurs at a position slightly outside of the outer periphery of the metal core 14. In the illustrated embodiment, it occurs approximately two-thirds of the depth or thickness of the jacket 12. Thus, there can be no cutting or nicking of the metal core 14. Once this initial radial cut is made, however, continued relative rotation in the direction 82 produces stripping of the jacket, such stripped material being in the form of helical coils of removed cable 12 which project out of an exit opening 84 in the device stripping end 30.

At this point in the description it should be understood that the remaining depth of the jacket 12, or the approximate one-third extent of its thickness, which exists between the point 83 and the outer periphery of the metal core 14 and which was not included in the initial radial cut produced by the cutting edge 72, is nevertheless lifted free from its position about the metal core 14 by virtue of being ruptured from its adherence to the cable by the forces produced by continued relative rotation 82 of the cable 16 and device 10. Thereafter, and as best illustrated in FIG. 8, the edge 74 and lifting ramp 70 are effective in cleanly pulling and lifting the jacket 12 from the metal core 14, this lifted portion of the jacket 12 then exiting through the exiting opening 84 as helical coils of removed or stripped insulation.

Completing the construction of the stripping end 30 of the device 10 is means for locking the plug 58 in place. This means includes an L-shaped bayonet type groove 86, the longitudinally oriented part of which is aligned with a depending pin 88 which permits insertion of the plug 58 within the counterbore 60. After this insertion, pin 88 enters into the transverse portion of the groove 86 and permits a counterclockwise traverse in the plug 58. Plug 58 is held in this rotated position under the urgency of a retaining spring 88 and holding member 90 which is pressed against the plug front wall 92. An enlarged diameter hand grip 94 facilitates turning of the plug 58.

From the foregoing description it should be readily appreciated that there has been described an efficiently functioning stripping device 10 capable of stripping the insulating jacket 12 cleanly from about the metal core 14 without subjecting the metal core 14 to nicking or cutting action of the cutting edge 72 of the device. The location of the cutting and stripping member 66, and more particularly the debth of the cutting edge 72 thereof with respect to the total thickness of the insulating jacket is understandably a critical relationship which must be established for each particular thickness of insulating jackets. Accordingly, it is contemplated that the stripping device 10 will be dimensioned to accommodate specific cable diameters having specific insulating jacket thicknesses. Alternatively, the device 10 can be provided with means for adjusting the diameter of the axial opening 26 and of the seated position of the cutting and stripping member 66 with respect to this axial opening.

A latitude of modification, change and substitution is intended in the foregoing disclosure and in some instances some features of the invention will be employed without a corresponding use of other features.

What is claimed is:

1. A cable jacket stripping tool comprising a body formed with a cable-receiving opening oriented longitudinally thereof adapted to accommodate therein a cable of a prescribed construction having an outer jacket of a selected thickness and an inner core, a cutting edge, means mounting said cutting edge in a position projecting into said cable-receiving opening in cutting relation with only a portion of said selected thickness of said jacket effective to cause cutting removal thereof, wedging means adjacent said cutting edge effective to force said cut jacket portion farther from said core so as to cause rupture of the remaining thickness of said jacket, thereby said cable jacket is removed from about the core of said cable while said cutting edge is maintained in a clearance position from said core to obviate the same touching of said core, a plug serving as a closure for one end opening of said cable-receiving opening, and said means mounting said cutting edge on an axially oriented support wall which intersects said cable-receiving opening to facilitate the positioning of said cutting edge in cutting relation with only a portion of said selected thickness of said cable jacket.

2. A cable jacket stripping tool as defined in claim 1 wherein said cutting edge and said wedging means are integral parts of a cutting member.

3. A cable jacket stripping tool as defined in claim 2 wherein said cutting edge and wedging means subtend an angle of 90°.

4. A cable jacket stripping tool as defined in claim 1 including a cable-measuring means operatively disposed in said other end of said cable-receiving opening effective to limit the depth of the projection of said cable within said cable-receiving opening, whereby the stripping of said cable is correspondingly limited to a select length therealong.

* * * * *